(12) United States Patent
Herget et al.

(10) Patent No.: US 11,577,397 B2
(45) Date of Patent: Feb. 14, 2023

(54) POSITION ACCURACY ROBOTIC PRINTING SYSTEM

(71) Applicant: Dusty Robotics, Inc., Mountain View, CA (US)

(72) Inventors: Philipp Josef Herget, Sunnyvale, CA (US); Shih-Chieh Hsiung, Santa Clara, CA (US); Jeogseop Lee, Mountain View, CA (US)

(73) Assignee: DUSTY ROBOTICS, IRC., Mountain View, CA (US)

( * ) Notice: Subject to any disclaimer, the term of this patent is extended or adjusted under 35 U.S.C. 154(b) by 103 days.

(21) Appl. No.: 16/991,932

(22) Filed: Aug. 12, 2020

(65) Prior Publication Data

US 2021/0046653 A1 Feb. 18, 2021

Related U.S. Application Data

(60) Provisional application No. 62/885,681, filed on Aug. 12, 2019.

(51) Int. Cl.
*B25J 9/16* (2006.01)
*G05D 1/02* (2020.01)
*B25J 13/08* (2006.01)
*B25J 13/00* (2006.01)

(52) U.S. Cl.
CPC ............ *B25J 9/1692* (2013.01); *B25J 9/161* (2013.01); *B25J 9/1653* (2013.01); *B25J 13/006* (2013.01); *G05D 1/0231* (2013.01); *B25J 13/088* (2013.01)

(58) Field of Classification Search
CPC ........ B25J 9/1692; B25J 9/161; B25J 9/1653; B25J 13/006; B25J 13/088; G05D 1/0231; G05D 1/0276; B41J 3/36; B05B 13/005
See application file for complete search history.

(56) References Cited

U.S. PATENT DOCUMENTS

| 4,875,291 | A | * | 10/1989 | Panique ................. G01C 15/06 359/527 |
| 5,453,931 | A | | 9/1995 | Watts, Jr. |
| 5,467,273 | A | | 11/1995 | Faibish et al. |
| 6,954,635 | B2 | | 10/2005 | Kim et al. |
| 7,806,493 | B2 | | 10/2010 | Gazeau et al. |
| 8,417,383 | B2 | | 4/2013 | Ozick et al. |

(Continued)

FOREIGN PATENT DOCUMENTS

| JP | 2019196978 A | * | 11/2019 |
| KR | 101071109 B1 | | 10/2011 |
| WO | 2015066461 A1 | | 5/2015 |

OTHER PUBLICATIONS

Machine translation of JP2019196978A.*

(Continued)

*Primary Examiner* — Robert T Nguyen
(74) *Attorney, Agent, or Firm* — Patent Law Works LLP

(57) ABSTRACT

A system and method for improving a position accuracy of a mobile robot is disclosed. A retroreflective device is mounted to the mobile robot and used by an absolute positioning device to use a laser beam to track a position of the mobile robot. The mobile robot receives position measurements. Various optimizations may be performed to support operating the mobile robot over a 360 degree range of azimuthal headings.

14 Claims, 12 Drawing Sheets
(4 of 12 Drawing Sheet(s) Filed in Color)

(56) References Cited

U.S. PATENT DOCUMENTS

| | | |
|---|---|---|
| 9,800,757 B2 | 10/2017 | Fujimoto et al. |
| 10,268,202 B1 | 4/2019 | Casale et al. |
| 2003/0041098 A1 | 2/2003 | Lortz |
| 2003/0117652 A1 | 6/2003 | Lapstun |
| 2004/0210319 A1 | 10/2004 | Lapstun et al. |
| 2007/0100496 A1 | 5/2007 | Forell |
| 2010/0143089 A1 | 6/2010 | Hvass et al. |
| 2010/0215216 A1 | 8/2010 | Hong et al. |
| 2011/0043515 A1* | 2/2011 | Stathis ............ G01C 15/002 434/118 |
| 2012/0200626 A1 | 8/2012 | Orr |
| 2015/0377605 A1 | 12/2015 | Bridges |
| 2017/0131398 A1 | 5/2017 | Younis |
| 2018/0107969 A1 | 4/2018 | Trivelpiece et al. |
| 2018/0216941 A1 | 8/2018 | Zhu et al. |
| 2018/0361585 A1 | 12/2018 | Williams et al. |
| 2019/0196492 A1 | 6/2019 | Casale et al. |
| 2019/0240912 A1 | 8/2019 | Alves |
| 2019/0381529 A1 | 12/2019 | Schaumberger |
| 2020/0408520 A1* | 12/2020 | Jensen ................ G02B 5/124 |
| 2022/0128667 A1* | 4/2022 | Hu .................... G01S 7/4817 |
| 2022/0351011 A1 | 11/2022 | Hassidov Pleser |

OTHER PUBLICATIONS

International Search Report and Written Opinion for PCT/US2020/050594, dated Dec. 8, 2020, 10 pgs.

International Preliminary Report on Patentability for PCT/US2020/029592, filed Apr. 23, 2020, dated Nov. 4, 2021.

Pierlot et al., "BeAMS: a Beacon based Angle Measurement Sensor for Mobile Robot Positioning," IEEE Transactions on Robotics, 30(3):533-549, Jun. 2014, 17 pgs. https://orbi.uliege.be/bitstream/2268/153647/1/Pieriot2014BeAMS.pdf.

International Search Report and Written Opinion, dated Nov. 4, 2020, for PCT/US2020/045994, International Filing Date Aug. 12, 2020, 14 pgs.

International Preliminary Report on Patentability fo PCT/US2020/045994, dated Feb. 24, 2022, 9 pgs.

International Preliminary Report on Patentability for PCT/US2020/050594, dated Mar. 24, 2022, 6 pgs.

Extended European Search Report for EP Application No. 20795759.8, dated Nov. 18, 2022, 9 pgs.

* cited by examiner

Access calibration data for reflector regarding angle at which the reflector gives the most precise position measurement 810

Control rotation angle of reflector to be within range of angles giving the most precise position masurements 820

POSITION ACCURACY ROBOTIC PRINTING SYSTEM

CROSS-REFERENCE TO RELATED APPLICATIONS

This application claims priority to U.S. Provisional Application Ser. No. 62/885,681, filed Aug. 12, 2019, titled "Position Accuracy Robotic Printing System", which is hereby incorporated herein in its entirety by this reference.

Aspects of the disclosure are generally related to determining a position of a mobile robot. More particularly, aspects of the disclosure are related to improving the position accuracy of a mobile robot printing system.

BACKGROUND

Mobile robots can be used for a variety of applications. One environment in which mobile robots could be used is at a construction jobsite, where a mobile robot could perform a variety of functions in the environment. One such application is the printing of drawings, text, or other markings on a construction surface, such as the concrete floor of a building under construction.

One of the challenges to building such a mobile printing robot is the precision at which the robot must deliver the markings. In the construction application, precision of less than 1/16" (1.6 mm) is generally required for making a construction layout. However, mobile robot positioning is generally not this precise. The commonly-accepted algorithm for determining a robot's position ("localization") inside a space uses sensor readings (typically LIDAR) of the robot's distance from known landmarks such as walls. However, even top-of-the-line LIDAR units only report distance to within centimeter (cm) accuracy, limiting a robot's ability to determine its own position precisely.

The current practice of construction layout is to hire human crews to lay out building components, such as walls, ducting, and wiring, by physically marking the flooring surface. Locations are referenced off of plans generated by an architect, and delivered to the jobsite typically in large rolls of blueprints or in digital form on tablet computers. The typical layout process comprises using measuring tape to measure out distances from known landmarks such as concrete pillars or control points inscribed in the concrete by surveyors, and tensioning chalk-covered string between two pins to mark straight lines. An alternative to using measuring tape to locate lines is the use of total stations to accurately place the line endpoints to within a tolerance of up to 1-2 mm of the desired location. This can improve both the speed and accuracy of a layout process conducted by human crews.

SUMMARY OF THE INVENTION

Implementations of the disclosure are generally directed to improving a position accuracy of a mobile robot used for printing on a construction surface. The mobile robot has a retroreflective device mounted on a surface of the mobile robot. It receives position measurements from the absolute positioning device that uses the retroreflective device to determine the position of the mobile robot. The mobile robot uses the position information during at least a portion of a printing operation using the received position measurements.

In some implementations, the rotation angle of a retroreflective device is controlled for it to face the absolute positioning device within an acceptance angle of the retroreflective device over a 360 degree variation in azimuthal heading of the mobile robot. In some implementations, the mobile robot corrects the position data to account for errors generated by the retroreflective device.

BRIEF DESCRIPTION OF THE DRAWINGS

This application contains at least one drawing executed in color. Copies of this application publication with color drawing(s) will be provided by the Office upon request and payment of the necessary fee.

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1A:
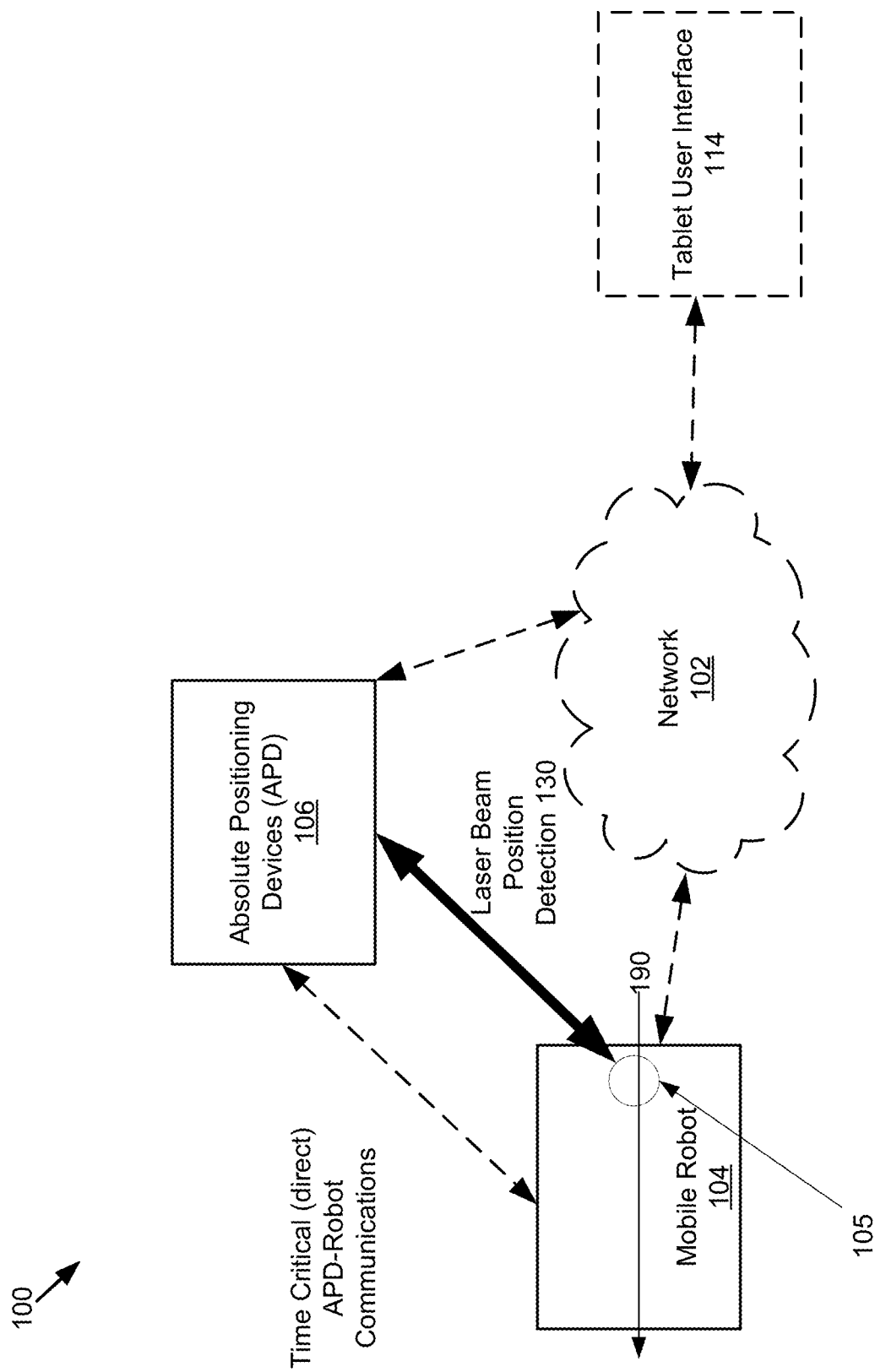
FIGS. 1A, 1B, and 1C illustrate a mobile robot printing system in accordance with an implementation.
Figure 1B:
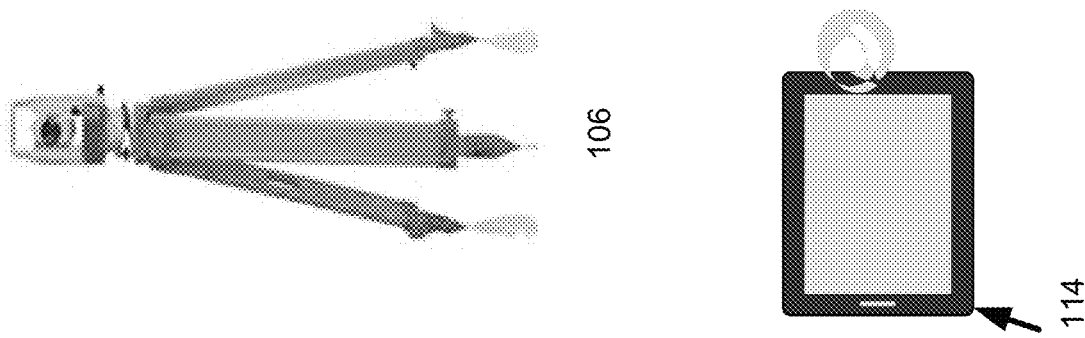
Figure 1B:
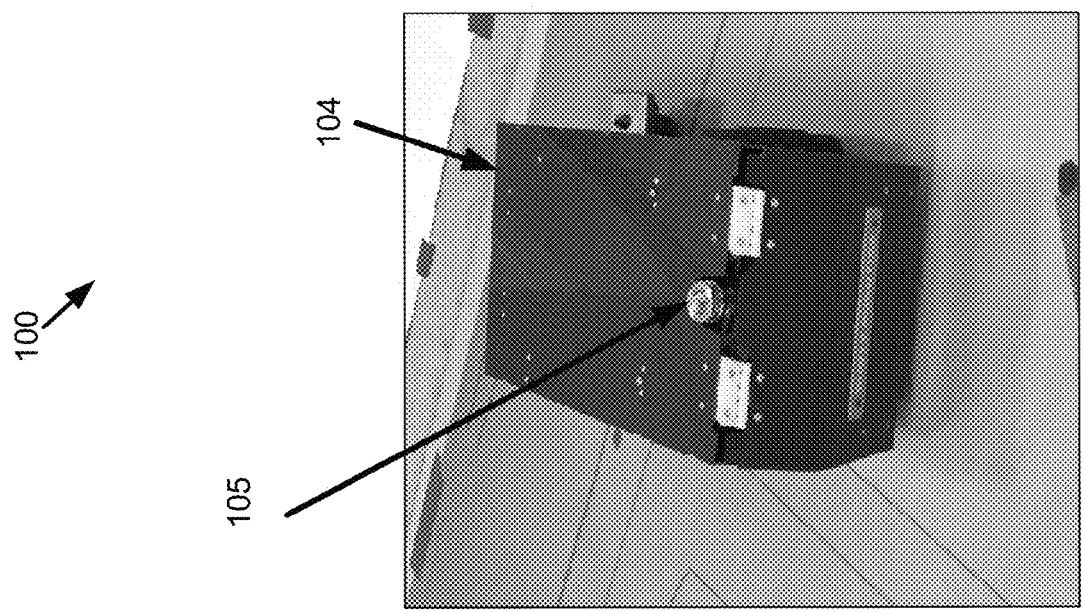
Figure 1C:
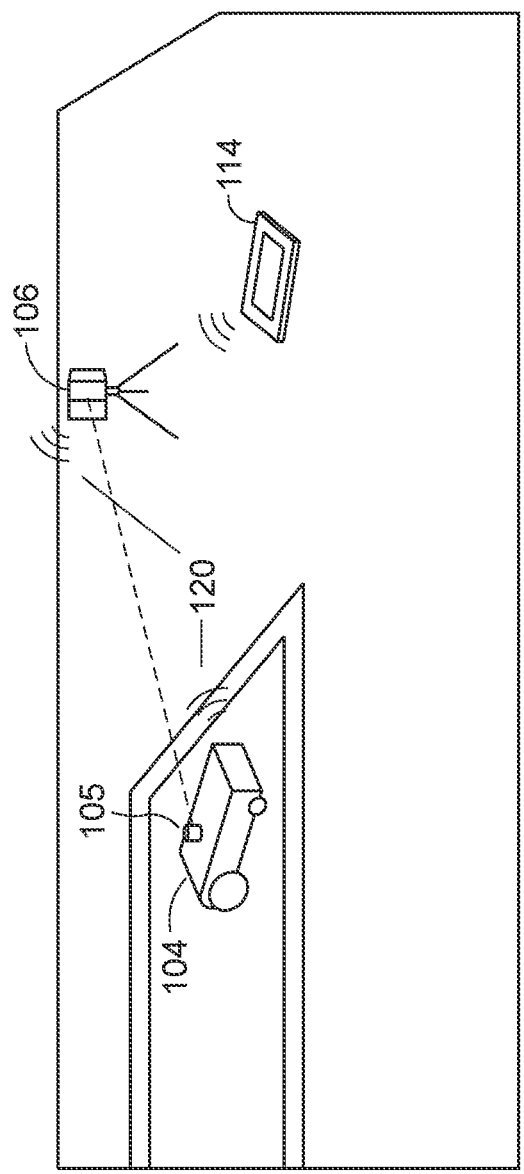

FIGS. 1A, 1B, and 1C illustrate implementations of a mobile robot printing system to use a mobile robot technology to move around a construction environment and make markings at specific locations. A mobile printing robot 104 autonomously navigates on a construction surface (e.g., concrete surface) and prints a building layout on the floor corresponding to an architect's plans for how a building is to be constructed.

Correct, accurate layout is of utmost importance to a construction project. Layout that is incorrectly drawn may result in costly rework, for example, if a wall is constructed in the wrong place and must be demolished and reconstructed. Incorrect layout may also result in code violations, such as failing to place a toilet at a specified distance from the wall per local building code.

There are a variety of problems related to using an absolute positioning device to accurately determine a position of a mobile robot. First, a mobile robot that is printing a layout is moving around a construction site. Second, there are also practical limitations on some of the components that can be used to determine an absolute position using optical techniques.

FIG. 1A is a high-level block diagram of a mobile robot printing system in accordance with an implementation. FIGS. 1B and 1C illustrate perspective views. As shown in FIGS. 1A, 1B, and 1C, an implementation of the system 100 comprises a mobile robot 104, one or more absolute positioning devices (APD) 106, and an optional portable computing device containing a user interface 114, such as a tablet computing device.

The APD 106 measures the robot's location by using a laser beam 130, to detect the location of a retroreflector which may be implemented in various ways such as in corner reflector, prism, or other retroreflective device 105, which can be affixed to the robot 104. This is illustrated in FIG. 1A. For example, the reflector, prism, or similar retroreflective device 105 can be permanently attached to the robot 104, detachably attached to the robot 104, or otherwise temporarily fixed. For example, a mounting structure may permit the reflector, prism, or other similar retroreflective device 105 to be mounted/demounted on the mobile robot.

The laser of the APD is shown as a solid line in FIG. 1A. In one embodiment, the measured location, determined by the APD, is communicated to the robot via a wireless link, 120 as illustrated in FIG. 1C. This link may use an existing network 102 such as WiFi, or alternatively it may happen though a direct communication channel using a radio or optical connection between the APD 106 and the robot 104. One advantage of a direct communication channel over WiFi is that it minimizes the potential for network delays that can occur in locations in which there is a lot of WiFi network traffic.

A low-latency and low variable latency communication link is desirable in regards to communicating position data to the mobile robot 104. This is because there are various tradeoffs between the velocity of the mobile robot, the desired printing accuracy, and the effect of latency in the receipt of location information being useful to improving the accuracy of the printing of the mobile robot 104. For example, suppose the mobile robot 104 moves at a velocity of one m/s. That would, in turn, mean that a 1 ms communication delay would correspond to a 1 mm distance traveled by the mobile robot. If the objective was to achieve on the order of 1 mm printing line accuracy, then in this example the time delay in receiving the location information would be coming later in time that would be ideal for controlling the movement of the mobile robot 104.

The communication link 120 may use an existing network such as WiFi. However, Wi-Fi can be subject to large delays in some locations, such as in cities in which there is a lot of WiFi communication near a construction site. LoRa (long range) communication protocols are another possibility. LoRa uses spread spectrum techniques to minimize interference. A local direct optical link is another possibility, such as using a separate laser beam (or Light Emitting Diode) to communicate location information on a direct link. A direct local radio frequency link is another possibility. In any case, a variety of different network communication techniques or a direct communication channel using a radio or optical connection may be used as the communication link between the APD 106 and the robot 104.

The mobile robot has a drive system. While omnidirectional drive is possible, the mobile robot may have a preferred longitudinal forward direction for printing purposes. As illustrated in FIG. 1A, there may be a longitudinal axis 190. Thus, as the mobile robot prints a layout, the longitudinal axis of the mobile robot changes its orientation with respect to the APD.

Figure 2:
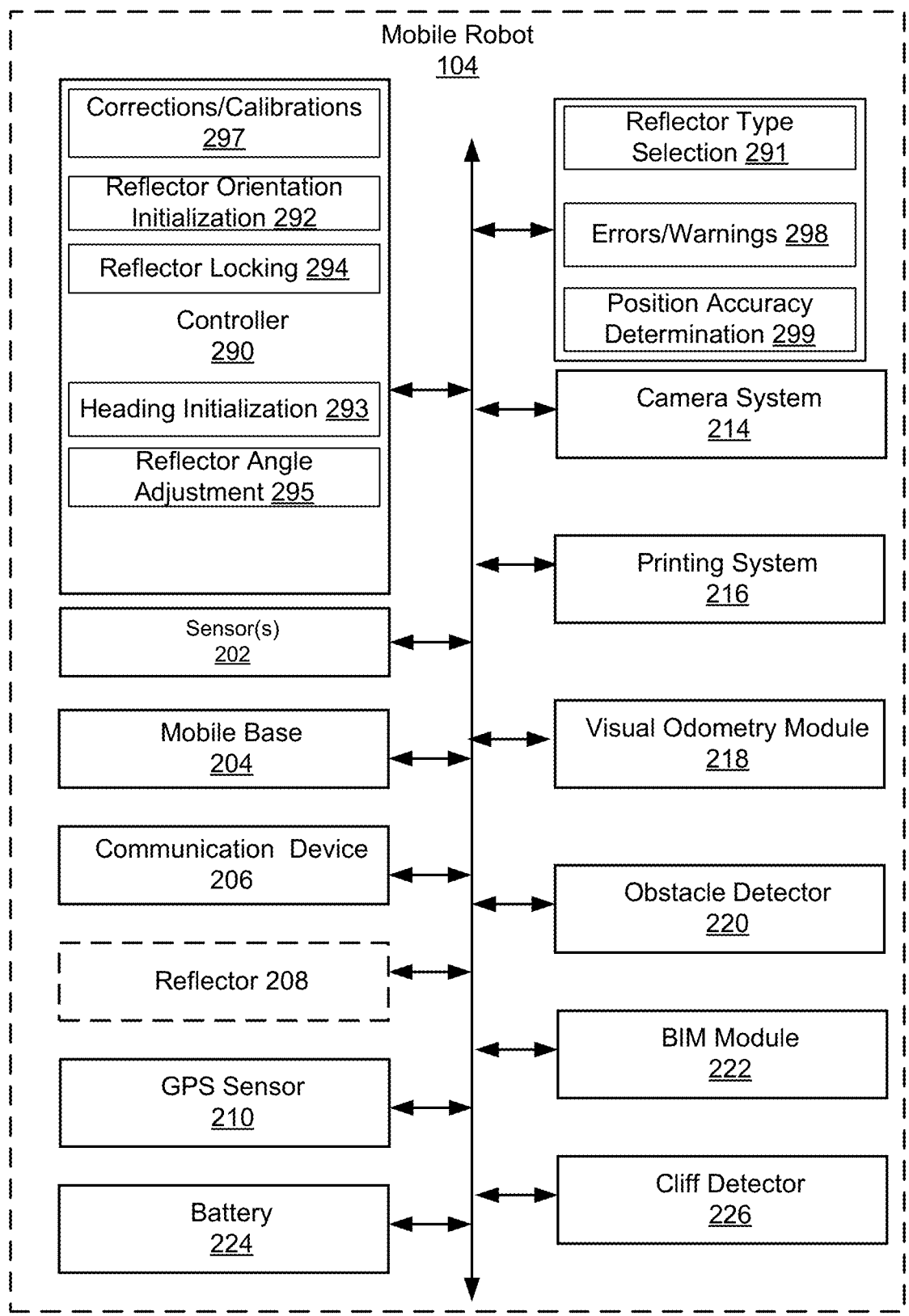
FIG. 2 is a block diagram of a mobile robot in accordance with an implementation.

As shown in FIG. 2, one implementation of the mobile robot 104 comprises a controller 290; one or more sensors 202, one of which may be an IMU, accelerometer, gyroscope, or compass; a mobile base 204 including features, such as motors and wheels to move the mobile robot; a communication device 206; a reflector 208, a printing system 216, a visual odometry module 218, an obstacle detector 220, a BIM module 222, a battery 224 and a cliff detector 226.

In one embodiment, the communication device 206 implements a wireless communication link with the APD 106 and/or the optional portable device 114.

General information on the lines to be drawn may be obtained from the Building Information Models (BIM) or architectural drawings. A version of this relevant BIM/drawing information may be stored in the controller 290 along with information corresponding to an obstacle map. For example, the obstacle map may include features derived from the BIM/drawing information as well as additional obstacle information collected on the construction site.

The controller 290 may include one or more modules to address some of the issues associated with using a particular type of retroreflective device 208. For example, while the controller 290 may be designed to support a single type of retroreflective device 101, more generally it may be designed to configure the controller to operate with a particular retroreflective device type. As described below in more detail, depending on the retroreflective device type, various optimizations may be utilized that are appropriate for the selected retroreflective device type. This may include optimization modules such as a reflector type configuration algorithm 291, an optimization module for a reflector orientation initialization 292, an optimization module for heading initialization 292, an optimization module for reflector locking algorithm 294, an optimization module for reflector angle adjustment algorithm 295, and an optimization module for corrections/calibration optimization 297.

The optimization modules 292, 293, 294, 295, and 297 may be implemented as computer program code executing on a processor of the controller 290. The optimization modules address various limitations and drawbacks associated with particular reflector types.

As described below in more detail, one or more optimization modules may take into account the optical properties of individual retroreflective device type and other factors related to using the APD to monitor the position of the mobile robot. The mobile robot may optionally include one or more modules to generate warnings 298 if position accuracy cannot be guaranteed within a desired range over an entire printing job. As another example, a warning may be generated if there is a failure to maintain a lock between the APD and the reflector. Factors related to position accuracy 299 may also be optionally monitored.

For example, in a printing application the mobile robot moves around a construction site. The mobile robot may move behind an obstruction such that a reflector lock is temporarily lost. Also, as described below in more detail, in moving around the job site, other factors may also influence position measurement accuracy such as the radial distance, azimuthal angle, and polar angle vary during the course of a printing job. It may be desirable to alert an operator or cease printing if a tight tolerance on printing accuracy is desired.

In one embodiment, the APD used in this robotic print system is the total station that is typically used on a construction site, such as those made by Trimble, Leica, Hilti, TopCon, or other companies. Alternatively, the APD might be a laser tracker. More generally, the APD may comprise any device that can determine position using laser beam and laser tracker to measure angles to a target and a range to the target.

There are several different types of reflectors that are compatible with the above-described APD devices and provide different levels of accuracy. However, this in turn creates several tradeoffs. To draw accurate and straight lines, it is highly beneficial for the APD to be able to measure the robot's position precisely. However, the types of reflectors that provide higher accuracy have limited acceptance angles, which is a major drawback.

In the robotic printing application, the mobile robot is moving around the construction site such that its orientation, with respect to a longitudinal axis of the robot and a reference azimuthal axis, is not fixed. Instead, the longitudinal axis of the mobile robot may be oriented along any angle within 360 degrees in the plane of the construction site.

For example, during a printing job the longitudinal axis of the printing robot may be oriented towards the APD during part of the printing but be misaligned up to 180 degrees away in another portion of the printing process. The APD would typically be mounted on a tripod above the plane of the construction surface (e.g., elevated by a few meters in height). The radial distance from the APD will also affect a radial angle, which can be calculated based on the height of the APD and the radial distance. For example, if the mobile robot is radially close to the APD, the laser beam will strike the reflector at a steep angle. However, if the mobile robot is radially far away, the laser beam will strike the reflector at a shallow angle.

While the mobile robot may include algorithms to adapt to brief interruptions in the position information from the APD, it is desirable that the mobile robot receive the position information regularly while it is printing lines so that the mobile robot has the most accurate information available regarding its current position when it is printing lines.

Figure 3A:
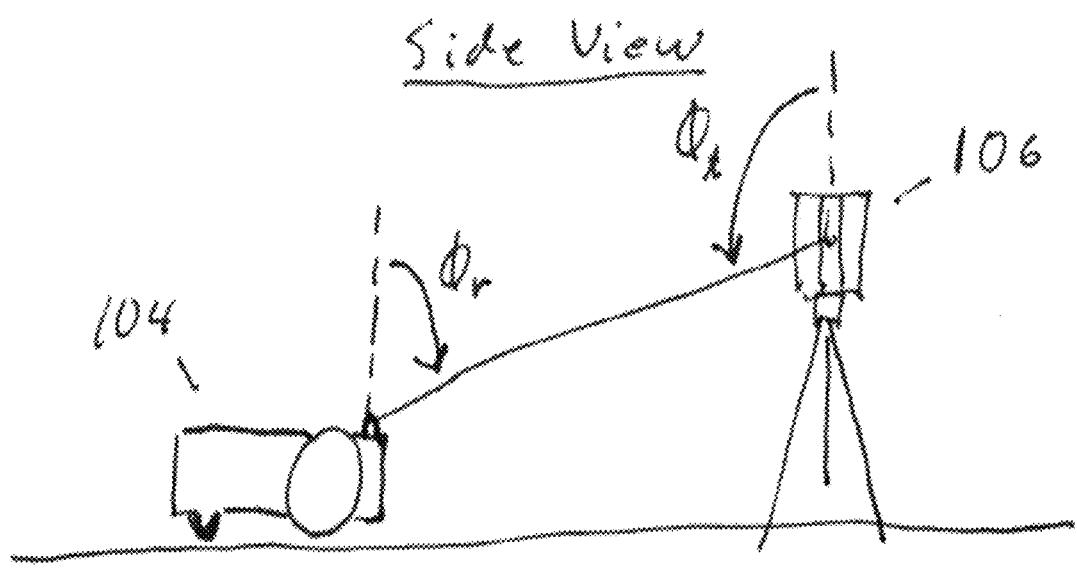
FIG. 3A is a side view and FIG. 3B is a top view illustrating APD and mobile robot angles.
Figure 3B:
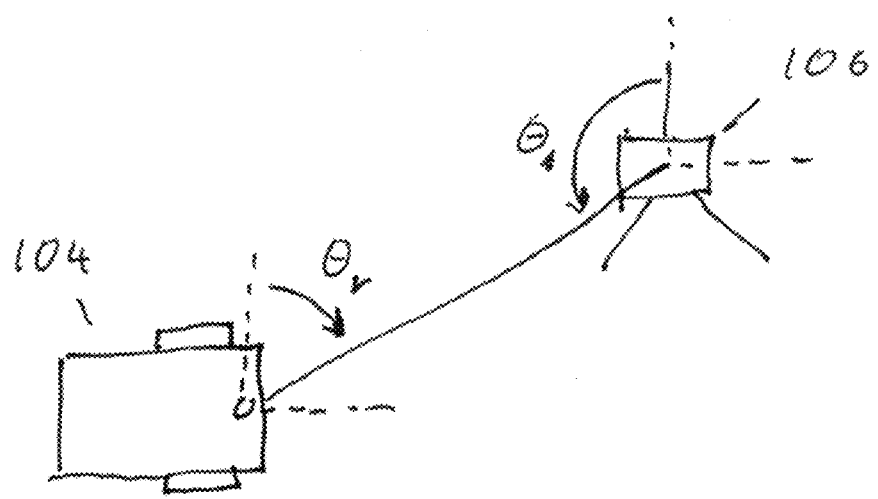

An APD implemented using a total station may include a servo tracking mechanism that uses the return light from the target reflector (e.g., reflector, prism, or similar retroreflective device 105) to keep the laser beam locked onto the target. FIGS. 3A and 3B show the various angles involved when an APD, 106, is measuring the position of the robot 104. In the figures, there are two sets of relevant angles, one on the total station side and one on the robot side. On both sides there is an azimuthal angle (theta), shown in FIG. 3B, and a polar angle (phi), shown in FIG. 3A. On the APD side the two angles are actively controlled by servo mechanisms and measured by high precision encoders. On the APD side, the polar angle is commonly referred to as the vertical angle or V, and the azimuthal angle is commonly referred to as the horizontal angle, or Hz. On the robot side, the polar angle, phi_r (ϕr) and the azimuthal angle, theta_r (Θr) are measured with respect to the local coordinate frame of the robot.

To print the highest accuracy lines, it is desirable to obtain position information from the APD as often as possible. This means the mobile robot needs, as much as practical while printing, to receive position information at any azimuthal angle theta_r with respect to the laser beam from the APD/total station.

Most robot drive mechanisms, such as the two wheel differential drive shown in FIGS. 3A and 3B, require the robot to make turns and rotate the robot's body with respect to the position of the APD to get from one point to another on the site. As can be inferred from FIGS. 3A and 3B, this will cause both the azimuthal and the polar angle on the robot side to change. The azimuthal angle will rotate through 360 degrees, whereas the polar angle will vary by a much smaller amount as the robot's distance from the APD/total station varies. This means that a 360-degree reflection capability with respect to the longitudinal axis of the mobile robot is highly desirable. It is also desirable to have a capability for the mobile robot to print both close and far away from the APD, corresponding to a range of polar distances from the APD that includes a range of incidence angles ranging from around 45 degrees to a fairly low angle when the robot is close to the total station. However, this polar angle requirement can be reduced drastically or even eliminated if the robot stays on a flat surface and the total station is placed at the same height as the robot's reflector. As is evident from the figure, if the APD is placed at the same height as the robot, the two angles phi_t and phi_r become fixed at 90 degrees.

As previously discussed, element 105 can be a reflector, prism, or similar retroreflective device that reflects the laser beam of the APD back. However, there are various tradeoffs for different types of retroreflective devices.

The simplest and most accurate reflector type is a corner reflector consisting of three mirror surfaces at right angles to each other. This type of reflector results in the highest accuracy measurements, however, its acceptance angle is limited to +/−45 degrees from the center of the device. The angular limitation is very restrictive in the context of a mobile printing robot moving around a construction site. As a practical matter, if the corner reflector is mounted to the mobile robot in a fixed position mount, it prohibits the conventional use of this reflector on the robot without adding more complex omnidirectional mechanics for robot locomotion.

One alternative to a corner reflector is a retroreflective prism. The retroreflective prism is constructed with an internal corner reflector that the laser and APD can lock onto. Due to their solid glass construction, prisms will refract the laser beam entering the prism and distort the location of the optical center. This effect is shown in the 2D representation of a prism illustrated in FIG. 4. The figure shows the glass prism 2101 with a laser beam 2103 entering the prism at an incident angle of theta_i through the front surface of the prism. When the beam enters the retroreflective prism it refracts due to the slowing of electromagnetic waves in glass, resulting in a reduced internal angle as described by Snell's law. The back surfaces of the retroreflective prism are typically coated to achieve the desired reflection characteristics. When pointed correctly, the beam will enter the prism, reflect off the apex of the rear surface 2105, and exit the prism along its arrival path.

Figure 4:
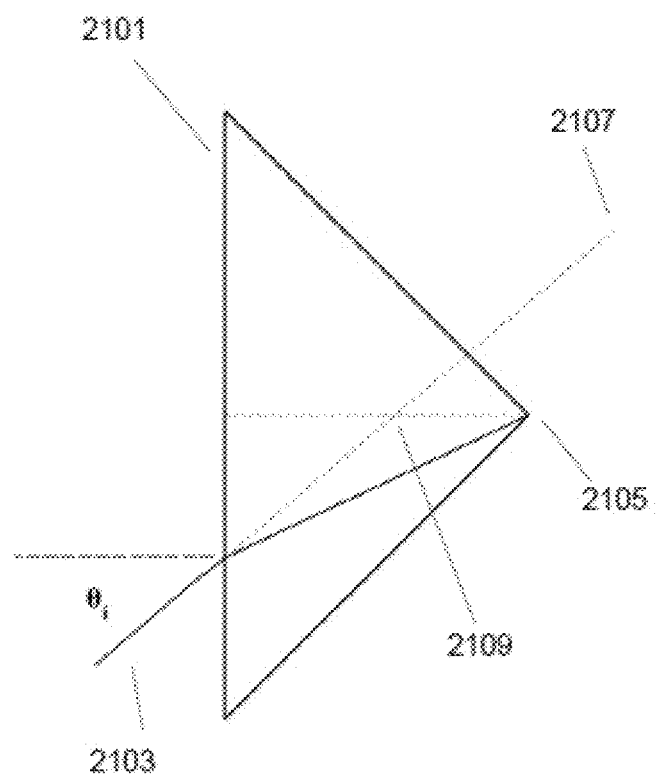
FIG. 4 illustrates refraction behavior in a prism and how that can generate a position measurement error.

Also shown in FIG. 4 is the perceived reflection point 2107, as would be measured by the APD. The APD perceives this point instead of the true center because it is not able to detect the optical effects of the retroreflective prism on the laser beam, nor is it capable of knowing the incident angle, theta_i, that the beam makes with the front face of the prism. The APD therefore assumes that the beam is traveling in a straight line and is not slowed by the glass of the retroreflective prism, causing the APD to measure a point that is both farther away (having longer travel time) and displaced from the true apex of the prism. As is clear from the discussion, using a retroreflective prism introduces an error into the measurements, where the error increases as the incident angle of the beam with respect to the surface normal of the prism becomes larger. Finally, as is clear from the geometry of the prism, the magnitude of the perceived error will scale with the size of the prism, meaning a retroreflective prism twice the size will have an error twice as big.

Additionally, FIG. 4 shows the location of a virtual optical center of the retroreflective prism 2109. This point 2109 is a location along the centerline of the retroreflective prism that any ray within a fixed range of incident angles (for example −30 to +30 degrees) will pass very close to. Subtracting a fixed distance from the point measured by the APD at any of these angles will result in a very good approximation to this point. If selected correctly, the magnitude of the residual error can be 0.1 mm or less. By mounting the retroreflective prism with its rotational center over this point, the location of the point can be determined by simply subtracting a fixed distance from the APD measurement and using the point 2109 as the optical center.

In other words, the controller 290 can correct the APD measurement to account for the optical properties of the retroreflective prism 2109. This correction can be implemented by the controller 290 according to an algorithm in which the controller calculates the virtual optical center of the prism 2109 and subtracts the fixed distance from the APD measurement and the virtual optical center.

Another type of reflector that is commonly used in construction is known as 360-degree prism. These reflectors are comprised of a number of individual glass prisms that are combined together to make a single reflective device that can be viewed from all azimuthal angles along the horizon. They also have a fairly large polar acceptance angle centered around the horizontal plane due to the acceptance angle of the individual prisms making up the device. This type of device will work with the robot configurations discussed above without any restrictions on azimuthal angle. However, there are two drawbacks to using this type of reflector. First, the accuracy of the position measurement with a 360-degree prism is typically limited to +/−2 mm due to the alignment of the individual prisms within the larger 360-degree prism structure. Second, the angular dependence of the reflection inside the prism glass (as illustrated in FIG. 4) will add to the first source of error and will further reduce accuracy. Furthermore, as with any prism, the loss in accuracy scales with the size of the prism, meaning larger 360-degree prisms are much less accurate. This results in an angular dependency that has continuous variation while the laser is locked onto a single prism in the cluster of a 360-degree prism. Moreover, this angular dependency is combined with abrupt jumps in accuracy as the laser beam of the APD switches to the next facet when the 360 degree prism is rotated. The second drawback is that the jumps between facets cause a brief interruption during which no measurement can be taken.

In one embodiment, a mobile robot print system is designed to provide accurate azimuthal positioning of a corner reflector using a servo controlled corner reflector. The controller 290 may, for example, be programmed to control the azimuthal angle of the corner reflector by taking into account its current location and heading and rotating the corner reflector to face the APD. The corner reflector is mounted with the corner point directly above center of rotation of the servo motor. To overcome the angular limitations of the corner reflector, the robot dynamically rotates the corner reflector as the robot moves about to keep the corner reflector facing the APD. Since a corner reflector is highly accurate over all input angles within the acceptance angle, and the polar angles shown in FIG. 3A are typically relatively small, servo control of the polar angle is not required given the geometry involved for typical construction site printing applications. This greatly simplifies the servo-control requirement, as is only required to servo control the azimuthal angle of the reflector in response to the rotation of the robot.

To allow the robot to operate over a variety of distances however, the corner reflector may be mounted at an upward angle from horizontal. For example, the reflector may be tilted so that the polar angle is centered on the reflector when the robot is halfway between its maximum and minimum polar angle as it operates both far away and near the APD. This allows the reflector to be seen at a distance far away from the APD, when the polar angle nears 90 degrees, as well as driving fairly close to the APD, where the polar angle can reach 45 degrees or less. As with the polar angle, the accuracy of the corner reflector is not affected by variations in the incident beam angle, as long as the APD still receives a return laser beam. Therefore, the angular accuracy for the servo system does not need to be very precise. In fact, servo control to +/−10 or +/−20 degrees is sufficient.

Figure 5:
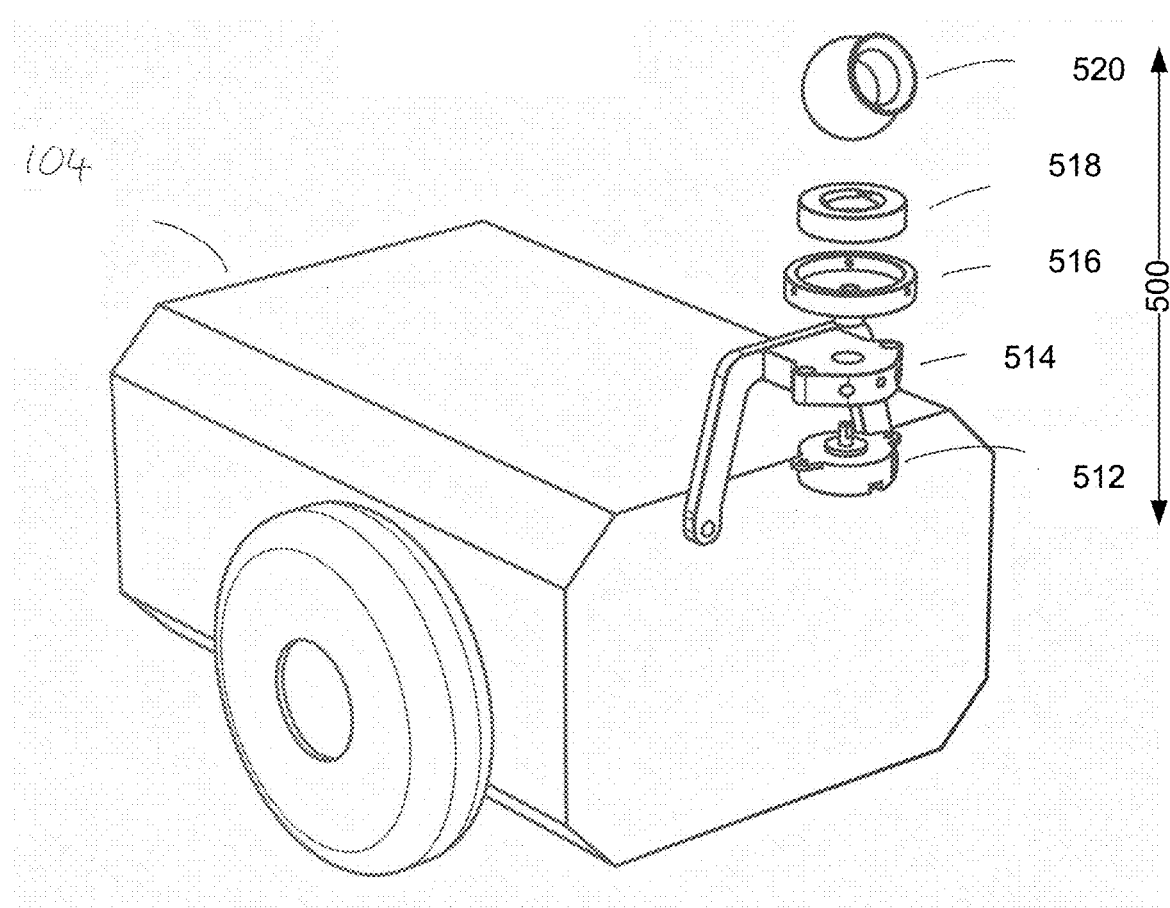
FIG. 5 illustrates a rotating reflector assembly in accordance with an implementation.

FIG. 5 is a mechanical drawing that depicts a rotating reflector assembly 500 for the robot 104 capable of keeping the reflector pointed at the APD while the robot is rotating, or moving with regards to the APD. In one implementation, the assembly 500 consists of mount, 514, a motor capable of absolute or relative positioning, 512, a cradle having centering adjustments, 516, a reflector mount, 518, and a reflector, 520.

Using the rotating reflector assembly 501, the orientation of the reflector can be controlled precisely by the control system (e.g. controller 290) on board the robot. The motor, 512, is any motor capable of absolute or relative positioning, such as a stepper or servo motor. The motor may, for example, have an integrated encoder for determining the absolute or relative position and the encoder may have an index signal for determining the absolute position. In one embodiment, the cradle is designed with 3 set screws such that the mount can be moved in two dimensions allowing the reflector's center to be precisely aligned with the axis of rotation. Finally, the reflector mount, 518 is designed to center within the mount and mate with the type of retroreflector to be used. In the example shown in FIG. 5, the reflector 520 is illustrated as a spherical mount corner reflector.

In a second example of the robot having a servo controlled reflector, the reflector on the robot is a single retroreflective prism with the apex of the prism mounted at the center of rotation of the servo. The prism provides some advantages over the corner reflector. Due to the refractive effects of the glass, it has a larger acceptance angle than the equivalent size corner reflector. Additionally, the single glass front surface is much easier to clean than a cavity with three mirrors inside. This is particularly important in the construction environment. However, as described earlier, the refraction in the retroreflective prism also comes with the accuracy penalty when the incident angle is not perpendicular to the prism face. Both the polar angle and the azimuthal angle contribute to this inaccuracy.

To overcome the angular inaccuracies of the reflector, the robot dynamically rotates the reflector under servo control, as was described in the previous corner cube example. This controls the azimuthal component of the incident laser beam, theta_i, and will eliminate the azimuthal component of the error as long as the servo is accurate enough to keep the azimuthal angle error small. Note that this requires more precise control of the angle than is needed for servo controlling the corner cube reflector. The remaining error due to the polar angle can also be eliminated in several ways. In one embodiment, the polar angle is kept constant by positioning the APD to be at the same height as the robot, such that the polar angle on the robot and APD (phi_r and phi_t in FIG. 3a) are always 90 degrees, regardless of the robot's position with respect to the APD.

In another embodiment of a robot using an actuated retroreflective prism, the APD is positioned above the plane of the robot. Here again, the laser incident angle theta_i in the azimuthal direction is kept constant using servo control, while the error introduced by the polar incident angle is mathematically corrected. One way of correcting for it is to use the geometry including both the difference in height between the APD and the robot and the distance between the two to calculate phi_r in FIG. 3A. From that geometry, the offset shown in FIG. 4 can be calculated. A second method can utilize the fact that the two polar angles phi_r and phi_t in FIG. 4 add up to 180 degrees. By using phi_t as measured by the APD, the angle phi_i can also be computed and the correction can be made. The above corrections can be computed by the controller 290 of the mobile robot 104. However, all of the information needed for the calculations is also present on the APD, so an alternative approach is to calculate the corrections on the APD and send only corrected data to the robot.

In another embodiment, the single prism is mounted on the servo stage with an offset, placing the virtual optical center 2109 over top of the rotation center of the servo stage. In this example, using the correct subtraction on the APD distance measurement, the robot's location can be estimated without needing to account for the polar or azimuthal angles of the incident laser beam.

One remaining downside of the servo controlled corner reflector is in initialization. In order for a lock to be established between the APD and the reflector, the reflector must first be facing in the correct direction. This may become a problem if the robot ever gets out of sync with the APD, or when the robot is first turned on. Methods of establishing this lock on a servo controlled corner cube will be discussed later. However, the 360 degree prism can be locked onto from any direction and does not suffer from this same downside. This would be easier to use than the corner cube or single retroreflective prism if it didn't suffer from the accuracy downsides. Similar to the single prism, the source of inaccuracy in the 360 prism arises from a variation in the incident beam angle and inaccuracies when the measurement point switches from face to face. However these inaccuracies can be overcome using servo control.

In a third example, a 360 degree prism is servo controlled on a robot. The 360 degree prism is mounted with its center over the center of rotation of the servo mechanism. In this configuration the apexes of the individual prisms are centered on the mount. By using the servo to keep the laser beam on a single face of one of the prisms, this 360 prism will act the same way as a single prism and the prism inaccuracies can be eliminated using the same techniques described in the previous embodiments. As the robot moves about, the laser is kept on a single face with a constant azimuthal angle, at least during a time period when the robot is printing. Similarly, the polar angle can be fixed by putting the APD in the same plane as the reflector, or the error can be subtracted mathematically by using the angle of the incident beam as measured by the APD. Using servo control, the 360 degree prism will act identical to the single prism, but have the advantage that the APD can lock onto the target from any angle before the system is initialized and starts pointing the reflector in the correct direction. To get the best precision, one of the prisms in the cluster may be selected and used during system calibration. By using the same prism face during navigation, the highest accuracy can be achieved.

To initialize the 360 degree prism angle after the APD locks on to the robot, the robot must first determine its heading. Once the heading is established, the prism can be rotated so the correct face is oriented toward the APD and the azimuthal angle error on that face is eliminated. Heading can be established by utilizing forward (or backward) motion of the robot and obtaining two or more measured points to establish a vector along which the robot moved. That vector will indicate the direction that the robot is facing relative to the APD and can then be used to orient the 360 degree prism.

In another variation of the 360 degree prism mount, the prism is offset from the center of the servo rotation. The offset places the virtual center of one of the prisms in the cluster over the rotation point. In this manner, the center of rotation of the servo can be calculated by a simple distance subtraction of the APD data. This is identical to the earlier description of the single prism, except in this case only one of the prisms in the cluster gives accurate data. Since the offset is not large, locking onto any of the non-calibrated prisms will still be accurate enough to establish a heading vector for the robot. In this manner, the APD can lock on the robot from any angle, initialize, and then operate with high precision and no angle dependent correction factors.

Figure 6:
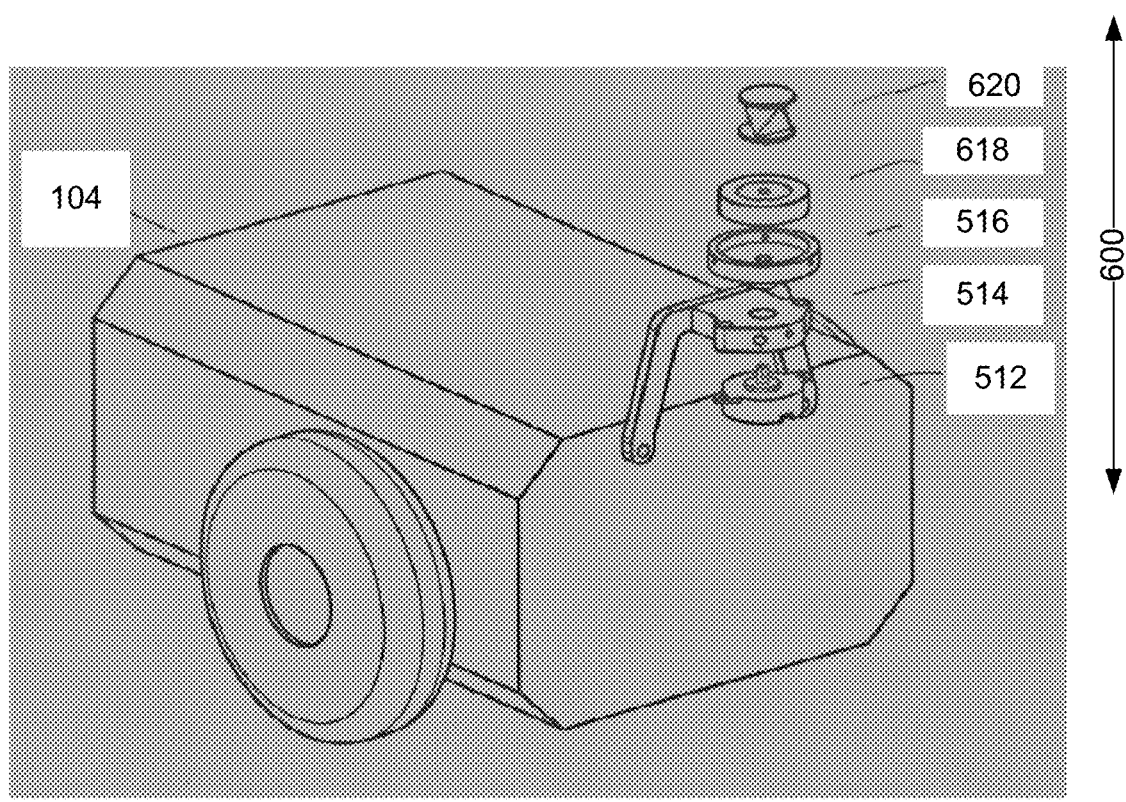
FIG. 6 illustrates a rotating reflector assembly in accordance with an implementation.

A third example using a 360 prism is shown in FIG. 6. It uses an identical system to the assembly 600 but has an alternate reflector mount, 618, designed to hold a prism. This mount interfaces with a 360-degree prism, 620. In this manner, any type of reflector can be centered and used with this mount. Other examples of reflectors that might be used are manufacturer specific reflectors, such as the Hexagon® cateye reflector, or active reflectors manufactured by total station manufacturers.

During operation, a controller of the mobile robot adjusts the angle of the reflector as the robot maneuvers through the building. For example, in one implementation, controller 290, alone or in combination with other processors of the mobile robot, implements an initialization and control process to adjust the rotation of the reflector to initially establish and maintain a lock with the APD. In one implementation, the APD uses light from the reflected beam as the position input to drive its control system, while the robot instead uses the position information it obtains from the APD in combination with its onboard sensors to estimate its current orientation and set the angle of the reflector such that it faces the APD precisely.

In one implementation, to accomplish this the controller 290 accounts for both the heading of the robot, and the position of the robot with respect to the APD. In this manner, as the robot rotates about the axis of the rotating mount, the mount is rotated in the opposite direction with an equal angle so it will continue to face the APD. Likewise, as the robot drives around the APD and the APD changes its angle to face the robot, the rotating mount on the robot turns at the same rate to continue to face the APD.

In one implementation, beginning these operations, the controller initializes the angle of the reflector. The initialization method used will depend on the type of reflector and the other sensors present on the robot. Additionally, the initialization method depends, in part, on the APD. In one embodiment, the initialization method supports a variety of mobile robot APD designs.

When using the corner reflector, the APD cannot use the corner reflector alone to measure the position of the robot until the reflector is facing in the correct direction and is within the acceptance angle.

Depending on implementation details, in some cases a robot may have a sensor capable of determining an absolute heading. For this case, this information may be used in combination with knowledge of the location of the APD to aid in performing at least part of the initialization. That is, the initial starting information may be sufficient to get an initial lock, which can be fine-tuned and then maintained during operation of the mobile robot.

However, some robot designs may not have a sensor capable of determining absolute heading. For example, the robot may not have a magnetometer, or the building may contain large ferrous objects that prevent using a magnetometer to obtain an accurate angular reading. Therefore, in some situations, such as after the robot is powered on, or after it has been physically moved and the reflector is pointing away from the APD, the robot may not know its position or heading. In these situations, initializing the angular position of the reflector can be used to determine an initial heading.

Figure 7:
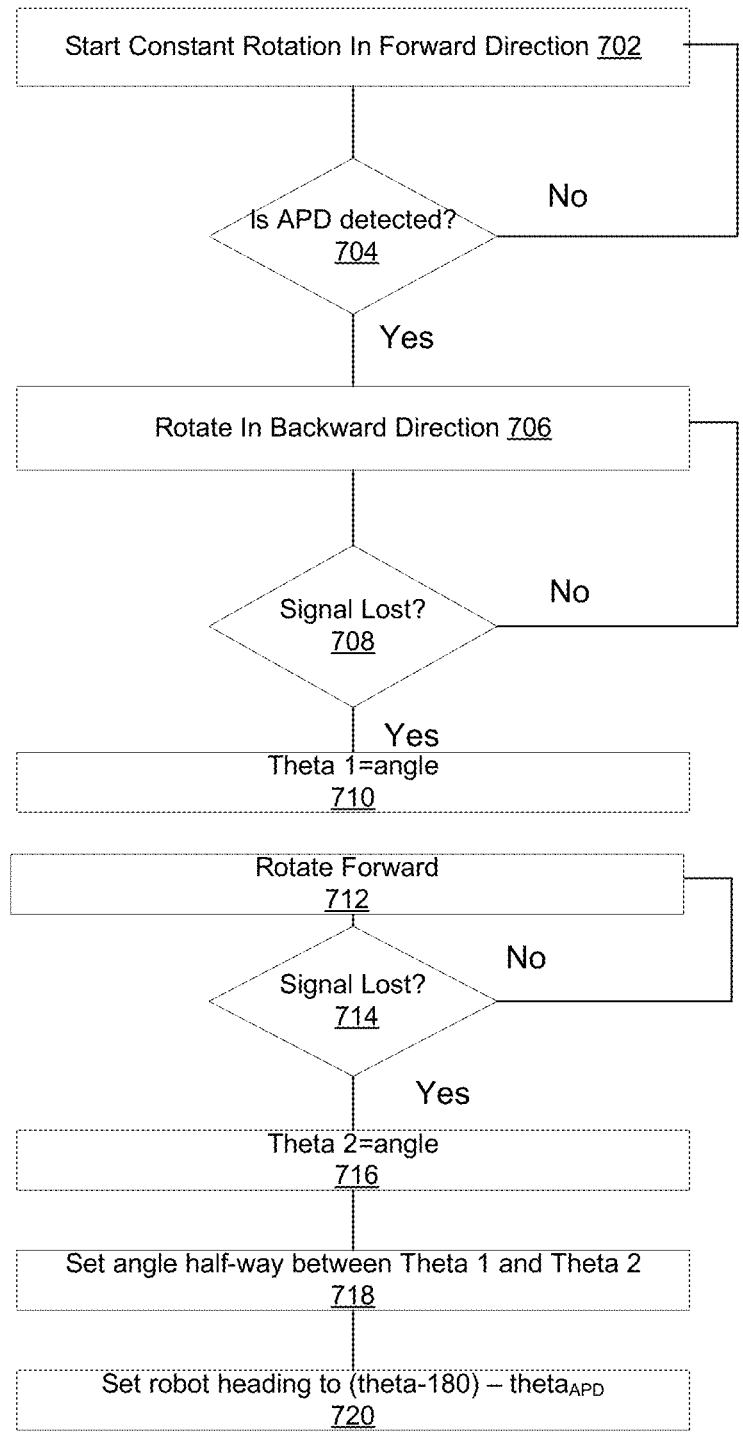
FIG. 7 is a flow chart of reflector initialization algorithm in accordance with an implementation.

FIG. 7 describes a reflector initialization algorithm that can be used to find and lock onto the APD's laser and also initialize the robot's heading. In the first step 702, the reflector mount is put into continuous rotation. During this period, an operator points the laser of the APD in the direction of the robot and onto the rotating reflector. Since the corner reflector has a 90-degree acceptance angle, there is a large window over which the APD will lock onto the target and create a signal. Once the APD is detected in step 704, the system starts rotating the reflector backwards in step 706. It then waits until the signal is lost in step 708 and records the angle as θ1 in step 710. The process is then repeated in the reverse direction in steps 712 and 714, and the second angle where the signal is lost is recorded as θ2 in step 716.

These two angles represent the two extremes about the center at which the prism can be locked and the position can be measured. To set the corner cube to face the tracker, the system rotates the mount halfway between θ1 and θ2 in step 718. Finally, the heading of the robot can now be determined using both the orientation of the rotating mount and the direction in which the APD is pointing. That is, the laser beam of the APD is pointed at some initial angle (in whatever coordinate system is being used) at the directional reflector and rotatable mount has some initial angle with respect to some reference angle of the rotatable mount (e.g., 0 to 360 degrees). In the next step 720, the direction that the APD is pointing, θAPD, can be read in from the APD. Then in step 722, the heading of the robot is determined as $\theta_{robot}=(0-180) -\theta APD$.

This technique also applies to a system that only has relative positioning capability on the rotating mount. However, in this case, the absolute heading of the robot, step 722, can't be performed. The robot can only determine the relative angle which causes the rotating mount to face the APD. Even though the absolute heading is not known, the robot can apply the same techniques as described earlier to rotate the mount to and adjust for the relative changes in heading of the robot and the relative angle of the APD to keep the reflector facing the APD at a constant angle. These techniques work for any directional reflector, such as a corner cube, retroreflective prism, cat eye, or other similar reflective device with a limited range of input angles.

When using the 360-degree prism, the prism can be sighted from all angles so initialization of the angle isn't needed to get initial position readings for the robot. However, high accuracy is only achieved once the prism is rotated at the correct angle with respect to the APD. To initialize this system the APD is first pointed and locked onto the prism. Then the robot's heading is established by either moving the robot a small distance and calculating the heading from the robot's position vs time, or by using one of the other robot's sensors. Once the heading is established, the prism is rotated to the angle at which the prism has been calibrated to give a precise position measurement. For example, the mobile robot may maintain calibration tables describing a range of angles over which the prism produces precise position measurements and this information used to aid in determining the rotation angle of the prism.

Figure 8:
FIG. 8 is a flow chart of a method controlling rotation angle of a reflector in accordance with an implementation.

FIG. 8 illustrates a method in accordance with an implementation. In block 810, calibration data is accessed regarding the angle at which the 360-degree prism gives the most precise position measurements. In block 820, the prism is rotated during use to the angle that gives the most precise position measurements. In practice, this may be a range of angles within a desired range of precision.

That angle is then maintained as the robot drives around. For example, the prism may be rotated to attempt to maintain an angle for which the laser beam is locked onto a facet of the 360-degree prism in a manner that gives the most precise position measurement. In another embodiment, the prism is mounted so the most precise measurement always occurs at a fixed angle, for example the angle theta=0. Then the prism is always rotated so that angle theta=0 faces the APD.

In another example, the robot uses a 360-degree prism that is fixed to the robot body and the mobile robot compensates for the inaccuracies of the prism. In this embodiment, the prism is first calibrated to determine an offset and angular dependency for each of the faces. This may include an angular dependency for both the horizontal and vertical directions. Then, as the robot is driving though the space, the robot continuously uses both its position with respect to the total station and its heading to calculate which face of the 360-degree prism is facing the APD and the angle that the incident beam makes with the prism. The robot then applies an offset based on the calibration data to correct any inaccuracies in the APD measurement and refines the three-dimensional position of the robot.

Figure 9:
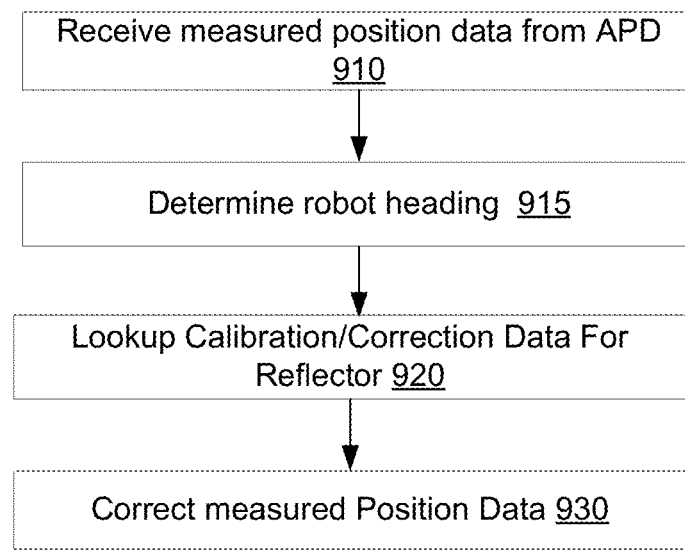
FIG. 9 is a flow chart of a method of correcting position data in accordance with an implementation.

FIG. 9 illustrates an example of a method. In block 910, the measured position data from the APD is received. Then in step 915, the robot determines it's heading either by using internal sensors or accessing the internal state generated by its localization algorithms. In block 920, calibration/correction data is accessed for the reflector. In block 930, corrected position data is generated using both the estimated position and heading information. This information may include both the azimuthal and polar angles that the APD laser is making with respect to the prism face (the incident angle).

For example, the mobile robot may store calibration data or calibration tables from which it can determine a correction factor to be applied to the measurement reading of the APD.

At some angular positions, there is more than one valid face that the APD may be locked onto. To apply the correction factors accurately, the robot also needs to know which of the faces the APD is currently reading. This can be done by keeping track of when the APD is jumping from one face to another. As one of the faces goes out of view, the APD may have a brief loss of signal as it is jumping to another face. This can be detected by the robot and the calibration for the next face can be applied. In other versions, the robot may have an interface to the APD through which it can query whether a face jump occurred.

The above-described corrections account for the properties of the retroreflector to improve precision. Which may be beneficial to achieve the highest printing accuracy.

It will also be understood that the different factors may work synergistically together. For example, reducing latency associated with the receipt of the position measurement data from the APD (e.g., by using a direct communication link) and taking steps to reduce measurement errors associated with the reflector can work in combination to facilitate improved control of position of the mobile robot. Alternatively, these steps may facilitate a greater ability to select higher robot speeds (e.g., 1 m/s or greater) and/or print larger areas without moving the APD.

The above-described examples provide improved position measurement accuracy of a mobile robot for printing lines of a building layout throughout a printing process in which the radial distance between the APD and the mobile robot may vary and in which a mobile robot's azimuthal heading may vary over 360 degrees while printing a layout. For example, a mobile robot that does not have omnidirectional drive (e.g., RWD) may have a preferred printing direction relative to a longitudinal axis and hence need to have its azimuthal heading vary over 360 degrees to print a layout.

The various optimizations are important for consistently achieving accurate position measurements within 1 to 2 mm, which in turn support accurate printing of lines for construction features such as walls.

Having a variety of different approaches is also useful to deal with practical issues at construction sites. For example, while corner reflectors offer certain advantages, they are harder to clean than some types of reflectors. This is a seemingly small point, but some construction sites have a lot of dust. For example, heavy trucks can kick up dust from dirt roads at a construction site. Some construction sites have sections of the job site in which construction materials are being sawn, kicking up small particles into the air that can land on optics. Construction can also take place in environments in which there is air pollution or smoke, such as if there are forest fires in nearby regions. Having a variety of different approaches permits the choice of reflector and optimization to be made based on multiple factors including cost, accuracy, and maintenance.

The previously described examples related to a general problem that there are limitations on the optical response of retroreflective devices. Using a 360 degree reflector has the drawback that such 360 degree reflectors are typically composed of a plurality of individual prism elements, as previously discussed. Other types of retroreflectors have various limitations on their performance. This include limitations on their angular response, which includes the acceptance angle. Examples have been described in the mobile printing robot performs at least one operation to adapt to a limitation of an optical response of the retroreflective device for the absolute positioning device to determine the position of the mobile printing robot. In various examples, this may include adapting to an limitation on an angular response. The limitation on angular response may include the acceptance angle. Other examples include limitations on an individual prism.

In some examples, a rotatable mount allows the mobile robot to adapt to limitations on the retroreflective device to be used by the absolute positioning device to determine the position of the mobile robot. In other examples, the mobile robot can correct for position errors, such as position errors generated by refraction in the retroreflective device.

While examples have been described using examples of optical components, it will be understood that equivalent structures and optical configuration may be used that differ from those illustrated.

Alternate Embodiments

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

To ease description, some elements of the system and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CDROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes, but is not limited to, firmware, resident software, microcode, etc. Furthermore, the technology can take the form of a computer program object accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A method, comprising:
   operating a mobile printing robot with a retroreflective device mounted on a surface of the mobile printing robot, the retroreflective device configured to return a laser beam of an absolute positioning device;
   receiving position measurements from the absolute positioning device; and
   controlling the position of the mobile printing robot based at least in part on the received position measurements;
   wherein the retroreflective device is a prism and the mobile printing robot corrects a position error generated by refraction in the prism.

2. The method of claim 1, wherein the prism is rotatably mounted to the mobile printing robot and the method further comprises controlling a rotation angle of the prism to face the absolute positioning device.

3. A method, comprising:
   operating a mobile printing robot with a retroreflective device rotatably mounted on a surface of the mobile printing robot, the retroreflective device including a plurality of prism elements with the retroreflective device configured to return a laser beam of an absolute positioning device;
   receiving position measurements from the absolute positioning device;
   controlling the position of the mobile printing robot based at least in part on the received position measurements; and
   controlling a rotation angle of the retroreflective device to select an individual prism element of the plurality of prism elements.

4. A method, comprising:
   operating a mobile printing robot with a retroreflective device rotatably mounted on a surface of the mobile printing robot, wherein the retroreflective device is a prism, the retroreflective device configured to return a laser beam of an absolute positioning device;
   receiving position measurements from the absolute positioning device;
   controlling the position of the mobile printing robot based at least in part on the received position measurements;
   controlling a rotation angle of the retroreflective device to adapt to an angular limitation on an optical response of the retroreflective device to improve a capability to determine the position of the mobile printing robot; and
   correcting a position error generated by refraction in the retroreflective device.

5. A method, comprising:
   operating a mobile printing robot with a retroreflective device rotatably mounted on a surface of the mobile printing robot, the retroreflective device configured to return a laser beam of an absolute positioning device;
   receiving position measurements from the absolute positioning device;
   controlling the position of the mobile printing robot based at least in part on the received position measurements;

wherein the retroreflective device comprises a plurality of individual prisms approximating a 360 degree prism; and
wherein a rotation angle of the retroreflective device is controlled to select an individual prism.

6. An apparatus, comprising:
a mobile printing robot;
a retroreflective device mounted to a surface of the mobile printing robot by a rotatable mount, the retroreflective device configured to return a laser beam of an absolute positioning device;
a wireless interface for the mobile printing robot to receive position information from the absolute positioning device; and
a controller to control movement of the mobile printing robot based at least in part on the received position information;
wherein the mobile printing robot is configured to control a rotation angle of the retroreflective device to adapt to an angular limitation on an optical response of the retroreflective device to improve a capability to determine the position of the mobile printing robot; and
wherein the mobile printing robot corrects a position error generated by refraction in the retroreflective device.

7. An apparatus, comprising:
a mobile printing robot;
a retroreflective device mounted to a surface of the mobile printing robot by a rotatable mount, the retroreflective device configured to return a laser beam of an absolute positioning device;
a wireless interface for the mobile printing robot to receive position information from the absolute positioning device; and
a controller to control movement of the mobile printing robot based at least in part on the received position information;
wherein the mobile printing robot is configured to control a rotation angle of the retroreflective device to adapt to an angular limitation on an optical response of the retroreflective device to improve a capability to determine the position of the mobile printing robot; and
wherein the retroreflective device comprises a plurality of individual prisms approximating a 360 degree prism and wherein the rotation angle of the retroreflective device is controlled to select an individual prism.

8. An apparatus, comprising:
a mobile printing robot;
a retroreflective device mounted to a surface of the mobile printing robot by a rotatable mount, the retroreflective device configured to return a laser beam of an absolute positioning device;
a wireless interface for the mobile printing robot to receive position information from the absolute positioning device; and
a controller to control movement of the mobile printing robot during at least a portion of a printing operation based at least in part on the received position information;
wherein the mobile printing robot regularly receives position information updates when the mobile printing robot is moving while printing a line and the mobile printing robot performs at least one operation, in response to the position information updates, to adapt to a limitation of an optical response of the retroreflective device to improve a capability to determine the position of the mobile printing robot.

9. The apparatus of claim 8, wherein the retroreflective device is a prism rotatably mounted to the mobile printing robot and the at least one operation comprises the controller controlling a rotation angle of the retroreflective device to face the absolute positioning device.

10. The apparatus of claim 8, wherein the retroreflective device includes a plurality of prism elements with the retroreflective device being rotatably mounted to the mobile printing robot and the at least one operation comprises the controller controlling a rotation angle of the retroreflective device to select an individual prism element of the plurality of prism elements.

11. The apparatus of claim 8, wherein the at least one operation includes implementing a correction factor to position data generated by the absolute positioning device to compensate for inaccuracies of the retroreflective device.

12. The Apparatus of claim 11, wherein the retroreflective device is a prism and the at least one operation corrects a position error generated by refraction in the prism.

13. The apparatus of claim 8, wherein the retroreflective device is rotatably mounted to the mobile printing robot and the controller controls a rotation angle of the retroreflective device to face the absolute positioning device within an acceptance angle of the retroreflective device.

14. The apparatus of claim 13, wherein the retroreflective device is a corner reflector.

* * * * *